United States Patent [19]

Bonanni et al.

[11] Patent Number: 4,998,796
[45] Date of Patent: Mar. 12, 1991

[54] METHOD OF ASSEMBLING MULTI-GROOVED SILICON CHIP FIBER OPTIC TERMINATIONS

[75] Inventors: Rocco Bonanni, Wayne; William J. Parzygnat, Morris Township, Morris County; Roger E. Weiss, Denville, all of N.J.

[73] Assignee: AT&T Bell Laboratories, Murray Hill, N.J.

[21] Appl. No.: 486,045

[22] Filed: Feb. 27, 1990

[51] Int. Cl.⁵ .............. G02B 6/38; G02B 6/40; B32B 31/00
[52] U.S. Cl. .............. 350/96.21; 350/96.20; 350/96.22; 350/320; 156/158; 156/160; 156/166
[58] Field of Search .............. 350/96.20, 96.21, 96.22, 350/320; 156/158, 160, 166

[56] References Cited

U.S. PATENT DOCUMENTS

| | | | |
|---|---|---|---|
| 3,864,018 | 2/1975 | Miller | 350/96.21 X |
| 3,912,574 | 10/1975 | Cherin et al. | 350/96.21 X |
| 4,029,390 | 6/1977 | Chinnock et al. | 350/96.21 X |
| 4,046,454 | 9/1977 | Pugh | 350/96.21 X |
| 4,379,771 | 4/1983 | Snyder | 264/1.5 |
| 4,475,790 | 10/1984 | Little | 350/96.21 |
| 4,653,845 | 3/1987 | Tremblay et al. | 350/96.16 |
| 4,657,341 | 4/1987 | Sammueller | 350/96.22 |
| 4,725,120 | 2/1988 | Parzygnat | 350/96.22 |
| 4,762,390 | 8/1988 | Finzel | 350/96.21 |
| 4,772,088 | 9/1988 | Finzel | 350/96.21 |
| 4,784,457 | 11/1988 | Finzel | 350/96.21 |
| 4,818,058 | 4/1989 | Bonanni | 350/96.20 |
| 4,818,059 | 4/1989 | Kakii et al. | 350/96.20 |
| 4,830,456 | 5/1989 | Kakii et al. | 350/96.20 |
| 4,836,638 | 6/1989 | Finzel | 350/96.21 |

OTHER PUBLICATIONS

Freeman et al., "Holding Fixture for Optical Fiber Array Connectors" West Elect. Tech. Digest No. 52 10/78 pp. 7–8.

*Primary Examiner*—Brian Healy
*Attorney, Agent, or Firm*—L. H. Birnbaum

[57] ABSTRACT

Described is a method for assembling multi-fiber array connectors. V-grooved silicon chips are placed in a holder which allows the chips to "float" with respect to each other and adjust to varying fiber diameters. Once the fibers are inserted, the chips are clamped and cemented together with the fibers fixed in the grooves.

10 Claims, 4 Drawing Sheets

METHOD OF ASSEMBLING MULTI-GROOVED SILICON CHIP FIBER OPTIC TERMINATIONS

BACKGROUND OF THE INVENTION

This invention relates to optical fiber connection, and, in particular, to a method of assembling connectors with fibers inserted therein.

Connectors for multi-fiber arrays typically include top and bottom silicon chips with V-shaped grooves formed in the facing major surfaces so that the fibers are position in the grooves. (See e.g., U.S. Pat. No. 4,725,120 issued to Parzygnat.) The usual method of assembling the connectors involves a stacking technique whereby the fibers are first inserted in the grooves of the bottom chip and then the top chip is positioned over the bottom chip and fibers by means of a special fixture. The chips are then clamped and removed from the fixture to a position where an epoxy and heat are applied to bond the chips together. (See, e.g. U.S. Pat. No. 4,379,771 issued to Snyder.)

While such a technique is adequate, it would be desirable to simplify the assembly by eliminating the need for a special fixture and thereby permit easier installation of connectors in the field.

An alternative approach to assembling multi-fiber connectors involves inserting the fibers after the top and bottom chips are bonded together. A clamp member is typically provided around the chips, and an area of the bottom chip is exposed to permit insertion of the fibers. (See, e.g., U.S. Pat. No. 4,818,059 issued to Kakii, et al.) One of the drawbacks of such a technique is the fact that the chips are bonded together prior to fiber insertion. Consequently, even if a partially cured adhesive is used, it is difficult for the assembly to adjust to varying sizes of optical fibers within a ribbon or from ribbon-to-ribbon.

It is, therefore, an object of the invention to provide a simplified assembly technique for multi-fiber array connectors which adjusts to varying sizes of optical fiber.

SUMMARY OF THE INVENTION

This and other objects are achieved in accordance with the invention, which is a method of fabricating optical connectors where an array of optical fibers is held within grooves formed in facing major surfaces of a pair of chips. The method comprises providing a holder including said chips, said holder comprising a cantilevered section which aligns the chips but permits a variable space between the facing major surfaces of the chips. An array of optical fibers is inserted in the grooves in the facing surfaces of the chips. The chips are then clamped so that the fibers are held within grooves formed in the facing surfaces of the chips, and the facing surfaces and fibers are then bonded together.

BRIEF DESCRIPTION OF THE DRAWING

These and other features of the invention are delineated in detail in the following description. In the drawings.

It will be appreciated that, for purposes of illustration, these figures are not necessarily drawn to scale.

DETAILED DESCRIPTION

Figure 1:
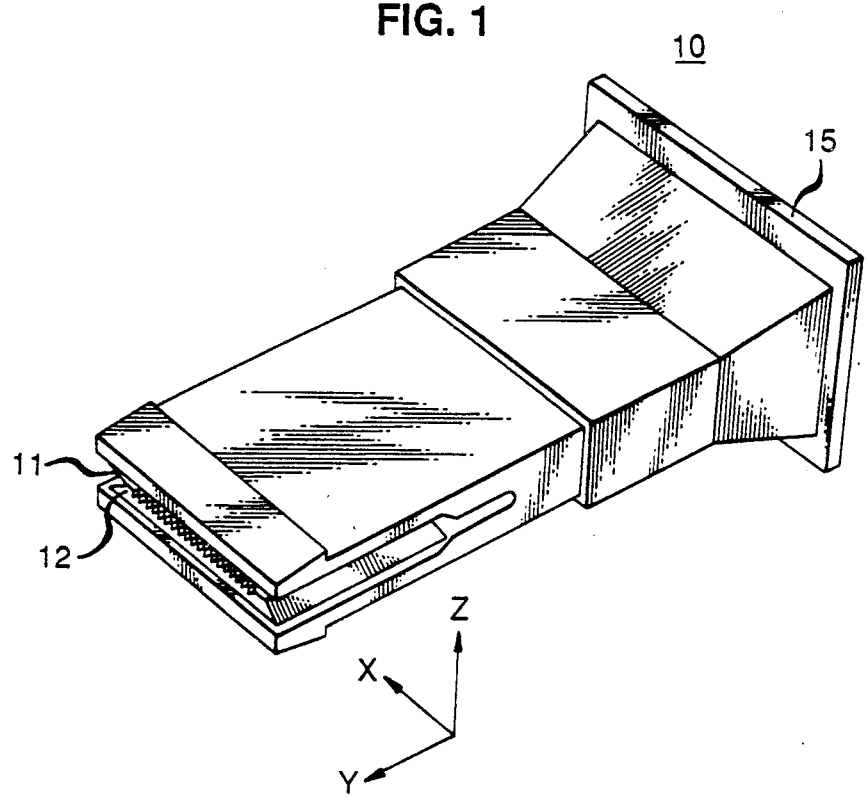
FIG. 1 is a perspective view of a holder and a pair of chips which can be used in accordance with one embodiment of the invention.
Figure 2:
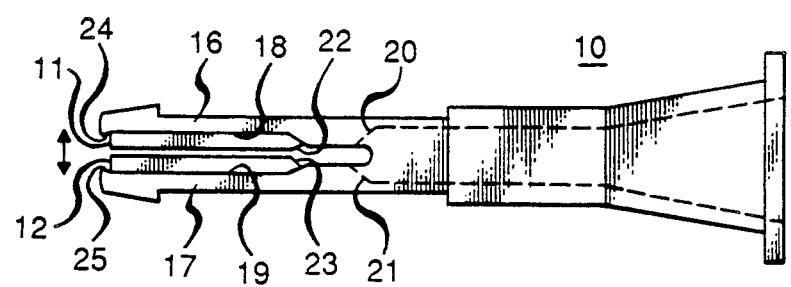
FIG. 2 is a side view of the holder in FIG. 1.
Figure 5:
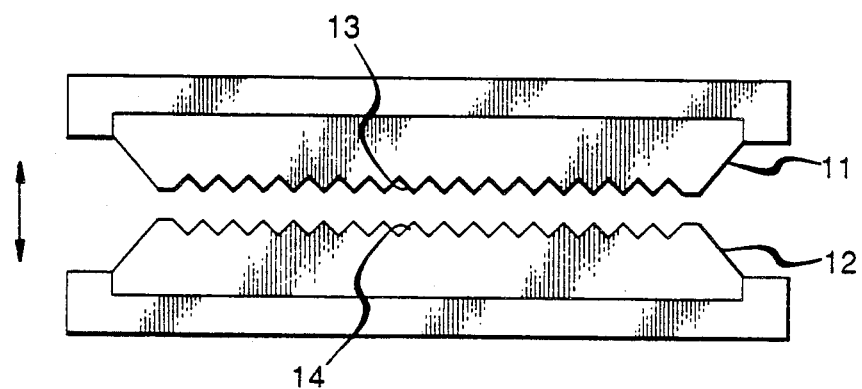
FIG. 5 is an end view of a portion of the connector in accordance with the same embodiment.

FIGS. 1,2 and 5 illustrate means which may be employed for assembling connectors in accordance with the invention. A holder, 10, is utilized for mounting therein a pair of silicon chips, 11 and 12. As more easily seen in FIG. 5, the top and bottom chips, 11 and 12, respectively, are of the standard type including V-shaped grooves, e.g., 13 and 14, respectively, in the facing major surfaces of the chips. (See e.g. U.S. Pat. No. 4,818,058 issued to Bonanni.) The chips typically are made of silicon, but could be other materials such as plastic. The chips typically measure approximately 0.76 by 6.3 by 5.84 mm and the grooves are typically approximately 100 $\mu$m deep and 140 $\mu$m wide. The grooves are usually formed by etching, employing an anisotropic etching solution, but other techniques can be employed.

Returning to FIG. 1, it will be noted that at one end, the holder, 10, has an entrance section, 15, which in this example is funnel shaped for easy insertion of an optical fiber array. This opening would typically measure approximately 7.4 by 4.3 mm for an array of 12 fibers.

The opposite opening of the holder, as also seen in the view in FIG. 2 comprises a cantilevered section including a pair of cantilevered arms, 16 and 17. Each arm includes seats, 18 and 19, for loosely holding the top and bottom chips, 11 and 12 respectively, The seats have essentially the same length and width as the chips so that the chips will be aligned in the x and y directions. The separation of the cantilevered members, 16 ad 17, however, is such as to leave a small gap, typically less than the fiber diameter, between two facing surfaces of the chips. Further, since the cantilevered arms are free to flex slightly and/or the chips are only loosely mounted in the vertical (z) direction, the gap between chips can vary as the fiber array is inserted therein. Thus, the chips "float" within the holder to allow the chips to be aligned by the fibers and to compensate for any variations in fiber diameter.

In some instances, the top chip may be resting on the bottom chip prior to insertion of the fibers. However, since the chips are free to move in the vertical (z) direction, the gap will vary as the fibers are inserted. On the other hand, if the gap is initially too large, the fibers in the ribbon may wander between the grooves in the chips. Consequently, the initial gap between the major surfaces of the chips should preferably be within the range 0 to 80 percent of the diameter of the fiber.

Figure 7:
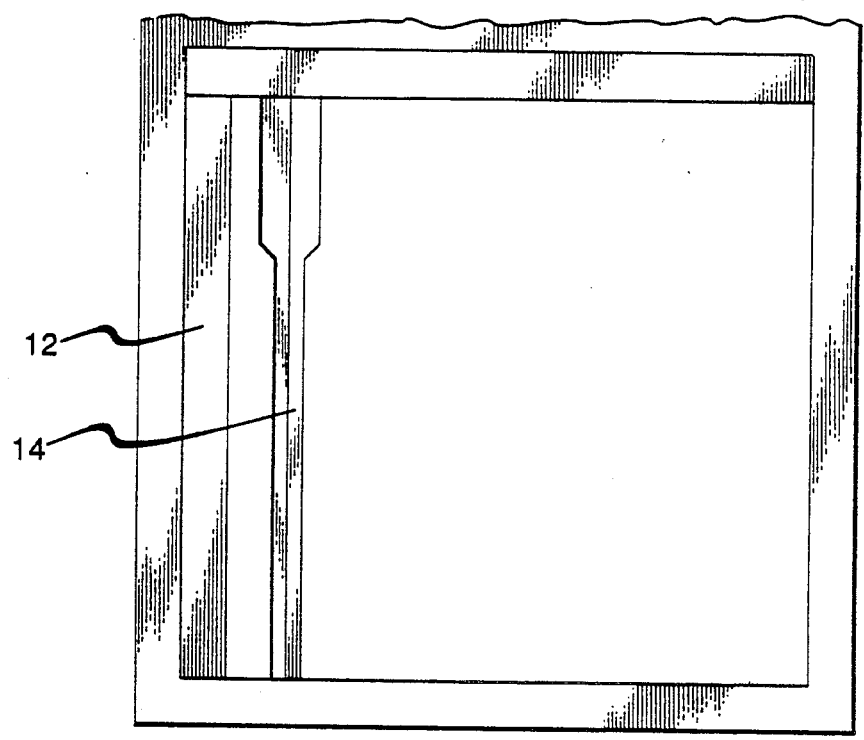
FIG. 7 is a top view of one of the chips of the connector.

It will also be noted that the separation between the cantilevered and the funnel sections of the holder comprises walls, 20 and 21, which are chamfered. Such walls, together with chamfered edges, 22 and 23, of the silicon chips, permits easy insertion of the fiber array into the gap between the chips. The fiber support grooves in the chip are also made wider at the end, as illustrated in FIG. 7, to facilitate easy insertion of the fibers.

The holder is typically plastic made by a standard molding process. Other materials could also be employed. The chips are inserted into the holder with the cantilevered section facing upward so that the chips fall into the seats, 18 and 19. The end of the cantilevered section is then deformed, in this example by heating, so that dimples, 24 and 25, are formed to keep the chips within the holder while maintaining the loose retention of the chips between the cantilevered members, 16 and 17.

Figure 3:
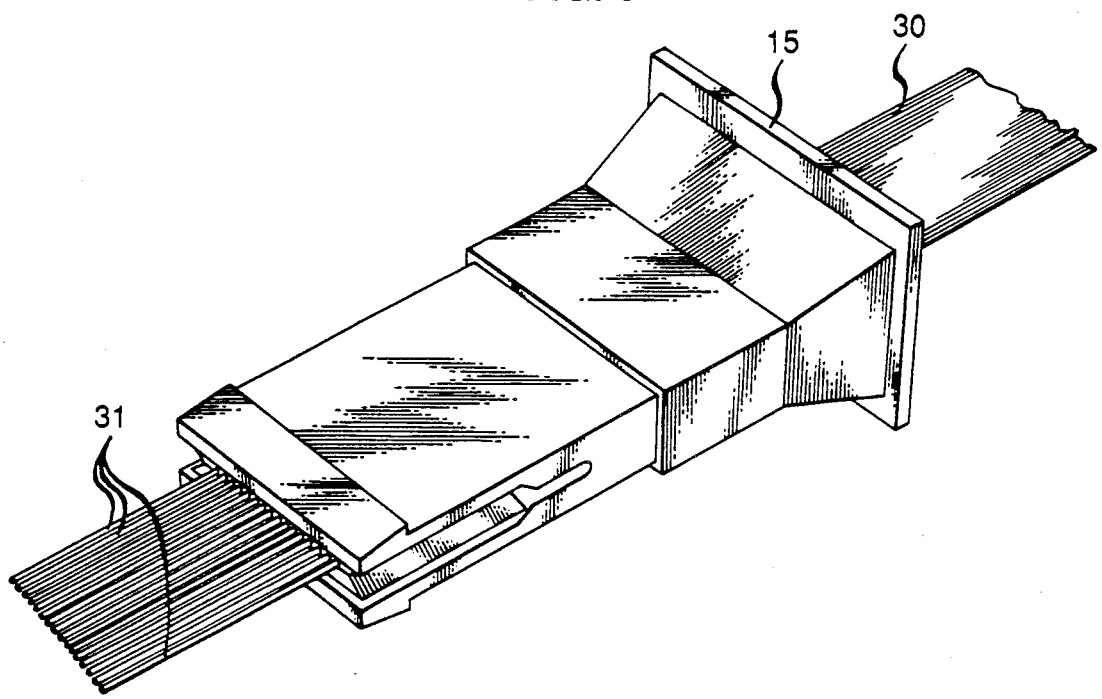
FIG. 3 is a perspective view illustrating one stage of assembly of a connector in accordance with an embodiment of the invention.

The assembly of the connector in the field starts with the holder and silicon chips mounted therein as previously described. A ribbon, 30, of FIG. 3 including an array of fibers, e.g., 31, is prepared by stripping off any protective covering at the ends of the fibers. The ribbon is then inserted into the entrance opening, 15, of the holder as shown in FIG. 3 so that the stripped portions of the fibers lie within the grooves formed between the top and bottom silicon chips. As mentioned previously, the gap between the major surfaces of the chip will vary as the fibers are inserted due to the flexing of the cantilevered arms and/or floating of the chips so that fibers of varying sizes will fit within the gap. In one example, the ribbon included 12 fibers each with a core diameter of 62.5 $\mu$m and an outer diameter of 125 $\mu$m. Typically, the gap between the major surfaces of the chips will vary between 12 to 100 $\mu$m during such fiber insertion.

Figure 4:
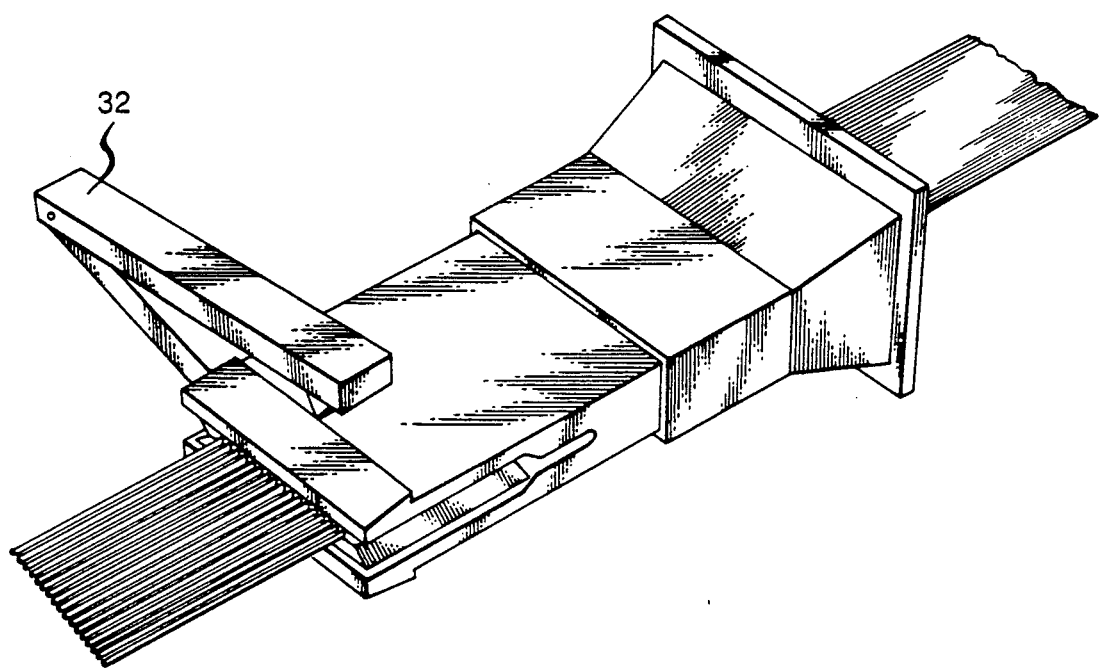
FIG. 4 is a perspective view illustrating a further stage of assembly of a connector in accordance with the same embodiment.

Once the fibers are inserted as illustrated in FIG. 4, the floating chips, 11 and 12 are clamped shut so that the fibers are seated with their appropriate grooves. The particular method described here utilizes a simple alligator clip, 32, to deflect the cantilevered arms against the chips, but any type of clamping mechanism can be employed. While the chips are thus clamped, a bonding adhesive (not shown) is applied in order to bond the top and bottom chips together and to fix the fibers within the grooves. This is accomplished, typically, by applying several drops of a low viscosity epoxy to the fibers in the vicinity of the chip and allowing the adhesive to wick into the chip openings. The particular adhesive employed was an epoxy such as that sold by Buehler Ltd. However, many standard bonding agents can be employed. Alternatively, the surfaces of the chips could be coated with B-stage epoxy prior to assembly. Subsequent to fiber insertion, the assembly could be heated in order to melt and cure the epoxy.

Figure 6:
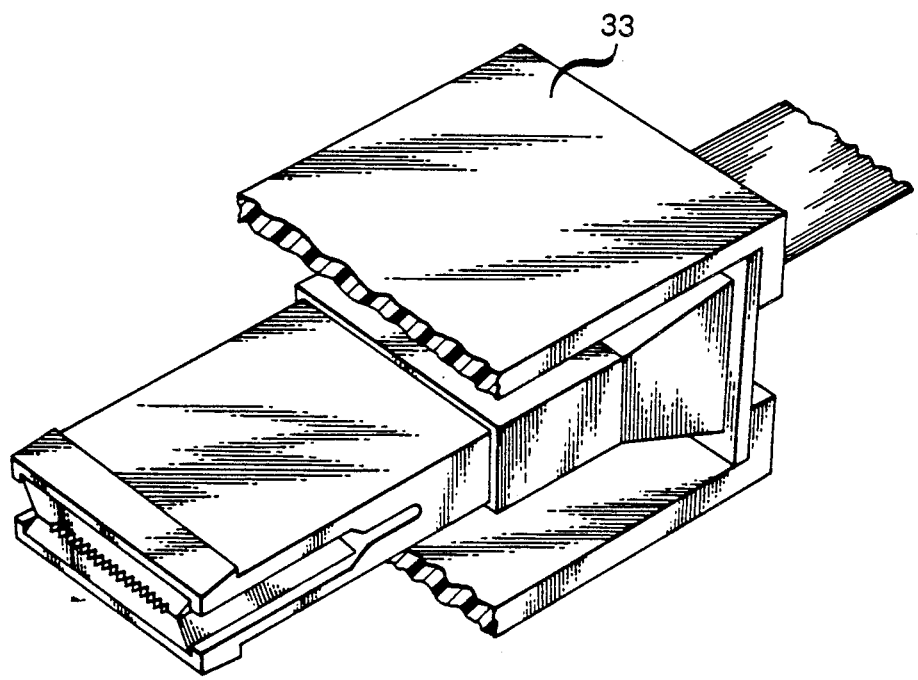
FIG. 6 is a perspective view illustrating a still further stage of assembly of a connector.

Subsequent to the bonding operation, the portion of the fibers extending out past the chips can be cut and polished according to standard techniques, resulting in the structure shown in FIG. 6. An appropriate housing, 33, and other parts, can then be placed around the resulting assembly to form a termination which can be mated with another termination of the same design. (See e.g., U.S. Pat. No. 4,725,120 issued to Paraygnat and U.S. Pat. No. 4,818,058 issued to Bonanni and incorporated by reference herein.)

Thus, it will be appreciated that, in accordance with the invention, a multi-fiber array connector plug can be assembled easily according to particular needs without a special fixture. An additional advantage of the method lies in the ability to check for broken fibers during the assembly process. This is accomplished by lightly tugging on the fiber ribbon after lightly clamping the chips so that the fiber ribbon can be moved longitudinally with respect to the chips. Any broken fibers can, therefore, be observed since they will not move along with the unbroken fibers in the ribbon. The ribbon, can therefore, be replaced prior to cementing the chips, thus saving the chips from destruction in the event of a defective fiber.

Various modifications will become apparent to those skilled in the art. For example, the holder, 10, can be designed to be removable after the chips are clamped and bonded together. All such variations which basically rely on the teachings through which the invention has advanced the art are properly considered within the scope of the invention.

We claim:

1. A method of fabricating optical connectors where an array of optical fibers is held within grooves formed in facing major surfaces of a pair of chips comprising the steps of:

providing a holder including said chips, said holder comprising a cantilevered section which aligns the chips but permits a variable space between the facing major surfaces of the chips.

inserting an array of optical fibers in the grooves in the facing surfaces of the chips:

clamping the chips so that the fibers are held within the grooves formed in the facing surfaces of the chips; and bonding the facing surfaces of the chips together.

2. The method according to claim 1 wherein the holder includes said cantilevered section at one end and an enlarged opening at an opposite end.

3. The method according to claim 1 wherein the chips comprise silicon.

4. The method according to claim 2 wherein between the cantilevered section and enlarged opening is a wall which is chamfered.

5. The method according to claim 1 further comprising the step of pulling on the array after lightly clamping the chips and prior to bonding the chips in order to test for broken fibers.

6. The method according to claim 1 further comprising the step of providing a housing surrounding said holder subsequent to bonding said chips so that the resulting assembly can be mated with a similar assembly to couple light between the fibers of the assemblies.

7. The method according to claim 1 wherein the spacing between the major surfaces of the chips can vary within the range of 0 to 80 percent of the fiber diameter prior to insertion of the fibers therein.

8. The method according to claim 1 wherein the cantilevered section includes a pair of opposite cantilevered arms, each including a seat within which one of said chips is mounted.

9. The method according to claim 1 wherein the entrance edges of the chips comprise a chamfer and an enlarged fiber guidance groove.

10. The method according to claim 1 wherein the spacing between the major surfaces of the chips can vary within the range 12 to 100 82 m during the insertion of the fibers.

* * * * *

UNITED STATES PATENT AND TRADEMARK OFFICE
CERTIFICATE OF CORRECTION

PATENT NO. : 4,998,796

DATED : March 12, 1991

INVENTOR(S) : Rocco Bonanni, William J. Parzygnat and Roger E. Weiss

It is certified that error appears in the above-identified patent and that said Letters Patent is hereby corrected as shown below:

Column 1, line 7, "connection" should read --connections--; line 13, "position" should read --positioned--. Column 2, line 10, "connector," should read --connector;--. Column 3, line 47, "with B-stage" should read --with a B-stage--; line 57, "Paraygnat" should read --Parzygnat--. Column 4, line 25, "chips." should read --chips;--; line 27, "chips:" should read --chips;--; line 62, "12 to 100 82 m" should read --12 to 100 µm--.

Signed and Sealed this

Twenty-fifth Day of August, 1992

Attest:

DOUGLAS B. COMER

*Attesting Officer*     *Acting Commissioner of Patents and Trademarks*